(12) United States Patent
Johnson

(10) Patent No.: US 11,048,476 B2
(45) Date of Patent: Jun. 29, 2021

(54) NON-LINEAR FEEDBACK SHIFT REGISTER

(71) Applicant: International Business Machines Corporation, Armonk, NY (US)

(72) Inventor: Andrew Johnson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 16/553,460

(22) Filed: Aug. 28, 2019

(65) Prior Publication Data

US 2021/0064343 A1 Mar. 4, 2021

(51) Int. Cl.
*G06F 7/58* (2006.01)

(52) U.S. Cl.
CPC .................... *G06F 7/584* (2013.01)

(58) Field of Classification Search
CPC ................................ G06F 7/58–588
See application file for complete search history.

(56) References Cited

U.S. PATENT DOCUMENTS

| 3,911,330 | A | 10/1975 | Fletcher et al. |
| 8,949,299 | B2 | 2/2015 | Wang et al. |
| 2004/0205095 | A1 | 10/2004 | Gressel et al. |
| 2005/0207207 | A1* | 9/2005 | Gammel .............. G06F 7/584 365/149 |
| 2007/0294327 | A1 | 12/2007 | Rajski et al. |
| 2010/0036899 | A1* | 2/2010 | Kaluzhny ............ G06F 7/58 708/251 |
| 2013/0191427 | A1 | 7/2013 | Farrugia |
| 2014/0254792 | A1 | 9/2014 | Gammel et al. |
| 2016/0211971 | A1* | 7/2016 | Lablans .............. H04L 9/0643 |
| 2017/0338946 | A1 | 11/2017 | Naslund et al. |

FOREIGN PATENT DOCUMENTS

| CN | 102176693 A | 9/2011 |
| CN | 102282536 A | 12/2011 |
| CN | 104238995 A | 12/2014 |

OTHER PUBLICATIONS

Anonymous, "Quasi-linear reduction of Hamiltonian Cycle Problem (HCP) to Satisfiability Problem (SAT)," an IP.com Prior Art Database Technical Disclosure, IP.com No. IPCOM000237123D, Jun. 4, 2014, 17 pgs.

(Continued)

*Primary Examiner* — Matthew D Sandifer
(74) *Attorney, Agent, or Firm* — Peter K. Suchecki

(57) ABSTRACT

Provided are a method and system for using a non-linear feedback shift register (NLFSR) for generating a pseudo-random sequence with at least near-maximal length for n number of stages, where a maximal length is $2^n-1$. The method may include selecting n, where n requires more than two taps in maximal length linear feedback shift registers; and generating, for the selected n-stage register, a pseudo-random sequence using a feedback logical operation of only a first logic gate and a second logic gate. Two suitable non-end taps are inputs for the first logic gate, an output of the first logic gate and an end tap are inputs for the second logic gate, and an output of the second logic gate is used as feedback to a first stage of the n-stage register.

25 Claims, 9 Drawing Sheets

(56) References Cited

OTHER PUBLICATIONS

Dubrova, E. "A List of Maximum Period NLFSRs," https://eprint.iacr.org/2012/166.pdf, Royal Institute of Technology (KTH), Form 120, 164 40 Kista, Sweden, accessed Jul. 10, 2019.

Dubrova, et al., "On Analysis and Synthesis of (n,k)-Non-Linear Feedback Shift Registers," IEEE, Design, Automation and Test in Europe, ©2008 EDAA, 6 pgs.

Johnson, A., "Linear Feedback Shift Register With Near-Maximal Length Sequences," U.S. Appl. No. 16/553,510, filed Aug. 28, 2019.

List of IBM Patents or Patent Applications Treated as Related, Aug. 21, 2019, 2 pgs.

The University of Texas at Austin, "Technical Reports," Computer Engineering Research Center, https://www.cerc.utexas.edu/reports.html, printed Jul. 10, 2019, 1 pg.

Unknown, "Maximum Period NLFSRs," https://people.kth.se/~dubrova/nlfsr.html, printed Jul. 10, 2019, 2 pgs.

Venkata, "Time Domain Properties of Non-maximal Length Sequences," http://www.iosrjournals.org/iosr-jece/papers/Vol.%2011%20Issue%203/Version-2/P110302101108.pdf, IOSR Journal of Electronics and Communication Engineering (IOSR-JECE), e-ISSN: 2278-2834,p-ISSN: 2278-8735.vol. 11, Issue 3, Ver. II (May-Jun. 2016), pp. 101-108, www.iosrjournals.org.

Wang et al., "High-Speed Hybrid Ring Generator Design Providing Maximum-Length Sequences with Low Hardware Cost," Computer Engineering Research Center, The University of Texas at Austin, https://www.cerc.utexas.edu/reports/UT-CERC-12-01.pdf, Oct. 4, 2011, 13 pgs.

Wang et al., "On Designing Transformed Linear Feedback Shift Registers with Minimum Hardware Cost," Computer Engineering Research Center, Department of Electrical & Computer Engineering, The University of Texas at Austin, https://www.cerc.utexas.edu/reports/UT-CERC-12-03.pdf, Nov. 8, 2011, 17 pgs.

Wikipedia, "Boolean satisfiability problem," https://en.wikipedia.org/wiki/Boolean_satisfiability_problem, printed Jul. 10, 2019, 9 pgs.

Wikipedia, "Conjunctive normal form," https://en.wikipedia.org/wiki/Conjunctive_normal_form, printed Jul. 10, 2019, 4 pgs.

Wikipedia, "Linear-feedback shift register," https://en.wikipedia.org/wiki/Linear-feedback_shift_register, printed Jul. 10, 2019, 8 pgs.

Wikipedia, "Nonlinear-feedback shift register," https://en.wikipedia.org/wiki/Nonlinear-feedback_shift_register, printed 7/10/190, 2 pgs.

Wikipedia, "OR gate," https://en.wikipedia.org/wiki/OR_gate, printed Jul. 10, 2019, 3 pgs.

Wikipedia, "XOR gate," https://en.wikipedia.org/wiki/XOR_gate, printed Jul. 10, 2019, 4 pgs.

Dubrova, E., "A Method for Generating Full Cycles by a Composition of NLFSRs," 2014, 16 pgs.

Vivelid, C., "Nonlinear Feedback Shift Registers and Generating of Binary De Bruijn Sequences," Thesis Document, University of Bergen, 2016, 60 pgs.

International Search Report and Written Opinion, International Application No. PCT/IB2020/057618, dated Dec. 18, 2020, 9 pgs.

* cited by examiner

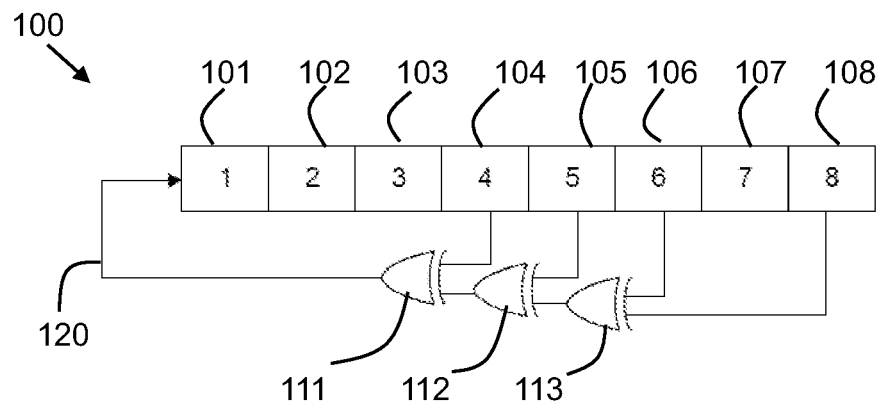
FIG. 1 *(Prior Art)*
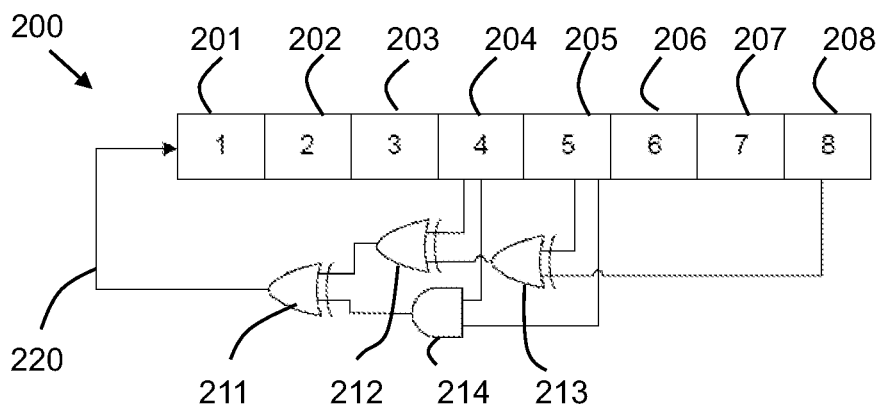
FIG. 2 *(Prior Art)*

NON-LINEAR FEEDBACK SHIFT REGISTER

BACKGROUND

The present invention relates to feedback shift registers, and more specifically, to a non-linear feedback shift register with maximal or near-maximal length sequences.

In the field of digital electronic circuits, a linear feedback shift register (LFSR) is a device for generating sequences of $2^n-1$ pseudo-random bits. LFSRs have numerous applications including cryptography, for example, where they are used for key stream generators, data compression, error detection and correction, etc.

A LFSR is a shift register whose input bit is a linear function of its previous state. The most commonly used linear function of single bits is exclusive-or (XOR), and the shift register has an input bit driven by the XOR of some bits of the overall shift register value. Both hardware and software implementations of LFSRs are common.

The bit positions that affect the next state are called the taps. A rightmost bit of the LFSR is called the output bit. In a Fibonacci LFSR, the taps are XOR'd sequentially with the output bit and then fed back into the leftmost bit. The sequence of bits in the rightmost position is called the output stream. A maximum length LFSR produces an n-sequence as it cycles through all possible $2^n-1$ states within the shift register except the state where all bits are zeros. It is also possible to use XNOR resulting in an equivalent polynomial counter.

The arrangement of taps for feedback in an LFSR can be expressed in finite field arithmetic as a polynomial mod 2, where the coefficients of the polynomial must be 1 or 0, referred to as the feedback polynomial.

LFSRs with maximum period can be constructed using a primitive generator polynomial over the binary field. The LFSR is maximal length if the corresponding feedback polynomial is primitive with the number of taps being even, and the set of taps being setwise co-prime.

The following is a table showing the feedback polynomials for n up to 24 bits from which maximal-length LFSRs can be constructed. There can be more than one maximal-length tap sequence for a given LFSR length.

| Register Stage Bit Number (n) | Feedback Polynomial | Maximum Period ($2^n$-1) |
|---|---|---|
| 2 | $x^2 + x + 1$ | 3 |
| 3 | $x^3 + x^2 + 1$ | 7 |
| 4 | $x^4 + x^3 + 1$ | 15 |
| 5 | $x^5 + x^3 + 1$ | 31 |
| 6 | $x^6 + x^5 + 1$ | 63 |
| 7 | $x^7 + x^6 + 1$ | 127 |
| 8 | $x^8 + x^6 + x^5 + x^4 + 1$ | 255 |
| 9 | $x^9 + x^5 + 1$ | 511 |
| 10 | $x^{10} + x^7 + 1$ | 1023 |
| 11 | $x^{11} + x^9 + 1$ | 2047 |
| 12 | $x^{12} + x^{11} + x^{10} + x^4 + 1$ | 4095 |
| 13 | $x^{13} + x^{12} + x^{11} + x^8 + 1$ | 8191 |
| 14 | $x^{14} + x^{13} + x^{12} + x^2 + 1$ | 16383 |
| 15 | $x^{15} + x^{14} + 1$ | 32767 |
| 16 | $x^{16} + x^{15} + x^{13} + x^4 + 1$ | 65535 |
| 17 | $x^{17} + x^{14} + 1$ | 131071 |
| 18 | $x^{18} + x^{11} + 1$ | 262143 |
| 19 | $x^{19} + x^{18} + x^{17} + x^{14} + 1$ | 524287 |
| 20 | $x^{20} + x^{17} + 1$ | 1048575 |
| 21 | $x^{21} + x^{19} + 1$ | 2097151 |
| 22 | $x^{22} + x^{21} + 1$ | 4194303 |
| 23 | $x^{23} + x^{18} + 1$ | 8388607 |
| 24 | $x^{24} + x^{23} + x^{22} + x^{17} + 1$ | 16777215 |

The "+1" in the polynomial does not correspond to a tap; it corresponds to the input to the first bit. The powers of the terms relate to the tapped bits, counting from the left. LFSRs with four terms plus the one, require four taps and therefore three XOR gates.

Referring now to FIG. 1, shown is an example 8-stage LFSR 100. The 8 bits 101-108 of the register are shown numbered from 1-8 with the $8^{th}$ bit being the rightmost output bit 108. In the illustrated embodiment, the 8 bit register shown has taps from the 4, 5, 6 and 8 bits, according to the polynomial $x^8+x^6+x^5+x^4+1$. Each of the taps provide linear feedback using XOR gates 111, 112, 113. The feedback 120 is input to the $1^{st}$ bit 101.

An adaptation is a top-bottom hybrid LFSR generator in which the top LFSR tap is XOR'd with the last tap and the result is fed into the stage after the top tap. The bottom tap is XOR'd with the last tap and the result is fed into the first stage of the shift register. Top-bottom hybrid LFSR generators can be used to reduce the 4 taps to 3 taps (two XORs) as follows:

{8,7,−6}
{12,9,−4}
{13,12,−11}
{14,13,−11}
{16,14,−7}
{19,18,−11}
{24,23,−19} where the first number is the number of stages, the second is the top LFSR tap and the third (indicated as negative) is the bottom LFSR tap.

With two XORs, in some cases, a hybrid LFSR can generate a sequence of $2^n-1$. However, this requires access to both the middle of the shift register and the end to insert data.

LFSRs have the drawback that their linear complexity is equal to their order. More recently, non-linear feedback shift registers (NLFSR) have been designed. NLFSRs are a generalization of LFSRs in which a current state is a non-linear function of the previous state. So, in NLFSRs the re-entrant bit is more than just a simple XOR operation of register bits. This frees the registers from the rigidity of Galois, Fibonacci, and other predefined taps, but then it is necessary to make sure that lockup does not occur, and the registers do not settle into a pattern.

A problem with NLFSRs is finding a systematic procedure for constructing NLFSRs with a guaranteed long period.

"A List of Maximum Period NLFSRs" Royal Institute of Technology (KTH), Forum 120, 164 40 Kista, Sweden by Elena Dubrova (referred to as "Dubrova") lists NLFSRs that provide maximal length sequences using multiple XORs and one AND gate. A complete list is presented of n-bit NLFSRs with period $2^n-1$, n<25, for three different types of feedback functions with algebraic degree two.

Dubrova uses many arrangements, one of which is three XOR and one AND gate for the bit registers that require 4 taps in the maximal-length LFSR, namely n={8, 12, 13, 14, 16, 19, 24} in the range n is less than or equal to 24. Dubrova also uses other arrangements: three XOR and two AND gates; five XOR and one AND gate; five XOR and two AND gates. For the n=8 case, Dubrova shows: three XOR and one AND gate with 15 examples; three XOR and two AND gates with 18 examples; and five XOR and one AND gate with 9 examples.

Referring now to FIG. 2, shown is an example 8-stage NLFSR 200 as proposed by Dubrova giving a maximal length sequence which is just one of the examples of the 15 options she proposes with three XOR and one AND gate. The 8 bits 201-208 of the register are shown numbered from 1-8 with the $8^{th}$ bit being the rightmost output bit 208. The 8 bit register shown has taps from the 4, 5, and 8 bits (T4, T5, T8). The non-linear feedback 220 is provided with three XOR 211-213 and one AND gate 214 as follows: T8 XOR T5 XOR T4 XOR (T5 AND T4). In Dubrova's notation where she numbers the taps (7 ... 0), this is "0, 3, 4, (3, 4)".

The problem addressed is to minimize the number of gates used in a logical feedback whilst maintaining maximal length sequences in pseudo-random number generators using feedback shift registers.

Feedback shift registers can also be used in problems expressed using Boolean Satisfiability. For example, LFSR sequences are used to solve the Hamiltonian Cycle problem. Minimizing the number of clauses to express the LFSR simplifies solving of the problem.

SUMMARY

Embodiments of the present disclosure include a method and system for using a non-linear feedback shift register (NLFSR) for generating a pseudo-random sequence with at least near-maximal length for n number of stages, where a maximal length is $2^n-1$. The method may include selecting n, where n requires more than two taps in maximal length linear feedback shift registers; and generating, for the selected n-stage register, a pseudo-random sequence using a feedback logical operation of only a first logic gate and a second logic gate, where two suitable non-end taps are inputs for the first logic gate, an output of the first logic gate and an end tap are inputs for the second logic gate, and an output of the second logic gate is used as feedback to a first stage of the n-stage register.

In embodiments, the first logic gate may be selected from a group consisting of an OR and a NAND gate, and the second logic gate is a XOR gate. In other embodiments, the first logic gate is an AND gate and the second logic gate is an XNOR gate.

In embodiments, for some n, a maximal length sequence is obtained with two suitable non-end taps, and for some other n, a near-maximal length sequence is obtained with two suitable non-end taps.

In embodiments, the method may include obtaining one or more suitable pairs of non-end taps by identifying, based on the number of stages n, pair combinations that provide at least near-maximal length sequences of the n-stage register. In embodiments, obtaining the one or more suitable pairs of non-end taps may include determining a first suitable pair of non-end taps that includes a first non-end tap A and a second non-end tap B; and obtaining a second suitable pair of non-end taps as the mirror of the first suitable pair of non-end taps in the n-stage register, where tap sequence [n, A, B] mirrors to [n, n−B, n−A].

In embodiments, obtaining the one or more suitable pairs of non-end taps includes using a search program operating on three taps: the end tap, and two non-end taps, using every combination of logic operation, except all zeros, subject to an optimization restriction that 1 and 0 are equally likely. In embodiments, the search program initializes the register to a value other than all zeros, and runs the register at most $2^n$ times until a register state is generated that is a repeat, where a length of the sequence is a number of states from a first occasion a state was seen to a second occasion the state was seen.

In embodiments, for a near maximal length sequence for a set of taps, the search program may determine if a number of states seen so far is $2^{n-1}$ or more. If the number of states seen is $2^{n-1}$ or more, then the longest sequence found is the longest possible for that set of taps. If the number of states seen is less than $2^{n-1}$, then a new state is chosen, the sequence is generated again, and the length is measured; and the search program repeats these steps until all the states are seen or the number of unseen states is less than the length of the longest sequence found.

Embodiments of the present disclosure include a NLFSR for generating a pseudo-random sequence with at least near-maximal length for n number of stages, wherein a maximal length is $2^n-1$. The NLFSR comprises an n-stage register, where n requires more than two taps in maximal length linear feedback shift registers; a first logic gate having two inputs, each input being connected to a non-end tap of the n-stage register; and a second logic gate having two inputs, a first input being connected to an output of the first logic gate and a second input being connected to an end tap of the n-stage register, where an output of the second logic gate is used as feedback to a first stage of the n-stage register.

Embodiments of the present disclosure include a NLFSR for generating a pseudo-random sequence with maximal length for 8 stages, where the maximal length is 255. The NLFSR includes a 8-stage register; a first logic gate having a first input connected to a first non-end tap A of the 8-stage register and a second input connected to a second non-end tap B of the 8-stage register; and a second logic gate having inputs connected to an output of the first logic gate and to an end tap of the 8-stage register. An output of the second logic gate is used as feedback to a first stage of the 8-stage register, and the first and second non-end taps are at positions selected from the group consisting of: A=4, B=3; A=5, B=1; A=5, B=4; and A=7, B=3.

Embodiments of the present disclosure include a NLFSR for generating a pseudo-random sequence with maximal length for n number of stages, where the maximal length is 4095. The NLFSR includes a 12-stage register; a first logic gate having a first input connected to a first non-end tap A of the 12-stage register and a second input connected to a second non-end tap B of the 12-stage register; and a second logic gate having inputs connected to an output of the first logic gate and to an end tap of the 12-stage register. An output of the second logic gate is used as feedback to a first stage of the 12-stage register, and the first and second non-end taps are at positions selected from the group consisting of: A=7, B=4; and A=8, B=5.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 1 is a schematic circuit diagram showing an 8-stage LFSR.

FIG. 2 is a schematic circuit diagram showing an 8-stage NLFSR with a non-linear feedback arrangement providing a maximal length sequence.

Figure 3:
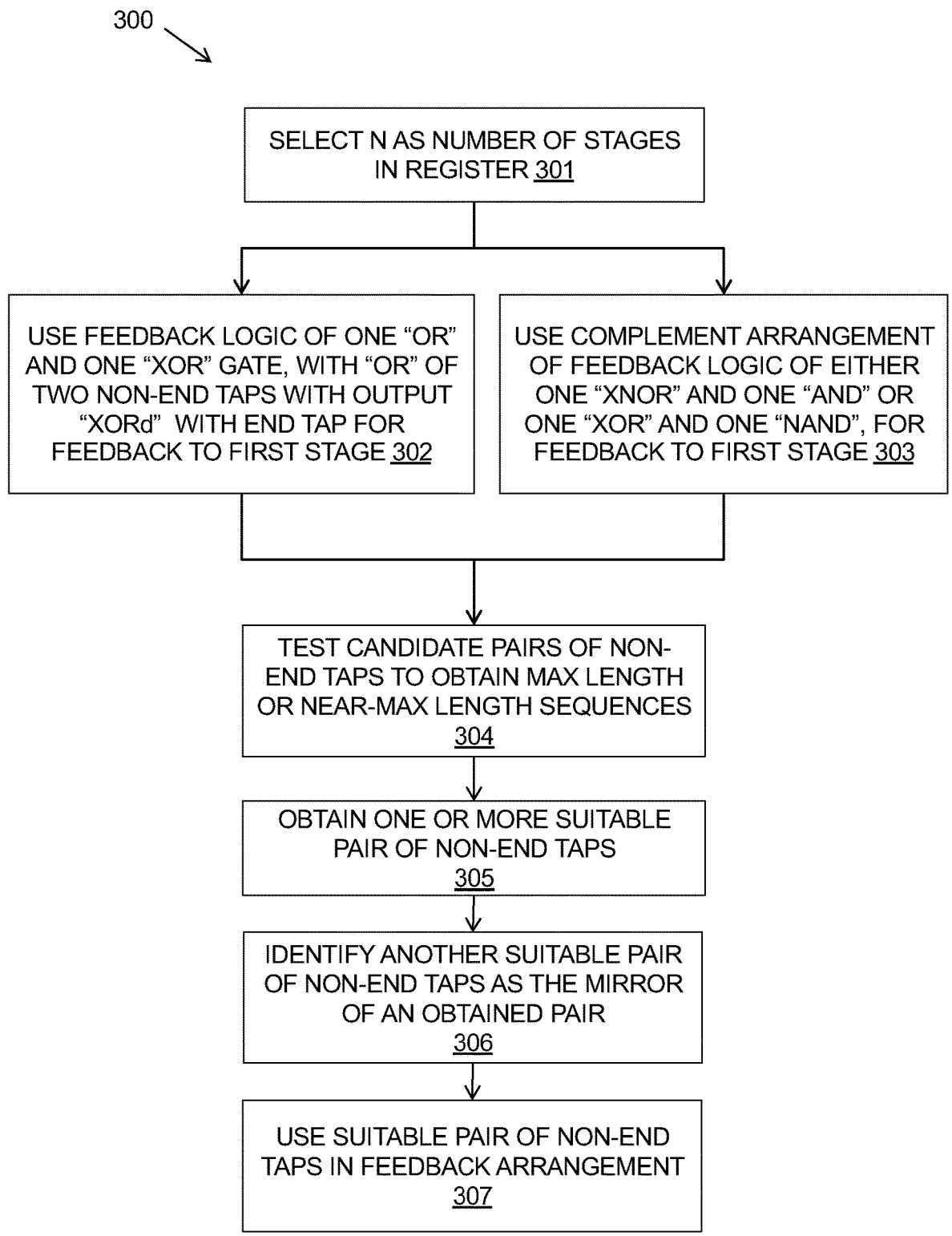
FIG. 3 is a flow diagram of an example embodiment of a method for providing a NLFSR, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The described method and system provide a non-linear feedback shift register (NLFSR) with maximal or near-maximal length sequences for generating a pseudo-random sequence for some registers having n number of stages that require more than two taps for maximal length in linear feedback shift registers (LFSRs), usually four or more taps. The four taps in LFSRs use three XOR gates.

The maximal length sequences are $2^n-1$, where the missing state is all 0s, or for a complement logical operation, all 1s. Near-maximal in this description is defined as less than 4% deviation from the maximal length.

The method and system have been tested up to n=24, and maximal length sequences are achieved using the described non-linear feedback for n=8 and n=12 of the group of n-stage registers that require more than two taps for maximal length sequences in linear feedback arrangements in LFSRs. However, other n-stage registers that require more than two taps for maximal length sequences in LFSRs may also exist for n>24, and the described arrangements may also be used for these larger values of n.

The described non-linear feedback arrangement of two gates may be used by other n-stage registers that require more than two taps for maximal length sequences in LFSRs but may only give near-maximal length sequences. These may also be useful as the non-linear feedback arrangement of only two gates in a simplified feedback.

A simplified logic operation is provided as feedback in a NLFSR that provides a minimum number of gates with a maximal or a near-maximal length sequence. Instead of the three XOR gates of an LFSR, a single XOR gate and a single OR gate are used in a feedback logical operation of a NLFSR. The logical feedback of only one OR and only one XOR gate takes logical OR of two selected non-end taps and XOR with the end tap as the feedback to the first stage. An alternative to XOR and OR is to use XNOR and NOR in an equivalent logical operation.

As equivalent alternatives to the single XOR gate and single OR gate in the described NLFSR, its complement arrangements may be used of a single XNOR gate and a single AND gate, or a single XOR gate and a single NAND gate. Complement arrangements take the inverse inputs.

The complement diagrams cover a slightly different but just as useful sequence. The missing state for the maximal length for the original circuit is all 0's, as 0 XOR (0 OR 0)=0 so the register stays as all 0's. The complement circuit has all 1's as the missing state, as 1 XOR (1 NAND 1)=1 XOR (0)=1.

The inversion can be done on the output of the XOR (=XNOR), or on the output of the AND=(NAND). Other variations utilize one or more of the inverted outputs of the flip flop elements shift register, the Q-bar outputs, to provide the inversions.

A wide variety of arrangements may be used for equivalent logical arrangements to calculate the same operation such as T8 XOR (!T4 NAND !T5), for example, and the !T4 and !T5 signals may be generated directly from the Q-bar outputs of the flip flops. The described registers are intended to cover all equivalents with two gates in their logical operation.

Considering the logical feedback of only one OR gate and only one XOR gate, for n number of stages (numbered 1 to n), inputs for the XOR gate are the output of stage n and the output of the OR gate, wherein inputs for the OR gate are the output of two suitable stages y1, y2 (y1<n)), (y2<n)), and y1 is not equal to y2) and wherein the input for stage 1 is the output of the XOR gate.

Referring now to FIG. 3, an example embodiment of the described method 300 for providing a NLFSR is shown in flow diagram.

In embodiments, the method 300 begins by selecting n as the number of stages in the register. This is illustrated at step 301. n requires more than two taps in a maximal length linear feedback shift register. A normal Fibonacci LFSR requires 4 or more taps but may be implemented with 3 taps by a hybrid LFSR, so n requires more than 2 taps.

For a selected n-stage register, the method 300 uses feedback logical terms of only one OR gate and only one XOR gate, taking logical OR of two non-end taps and output XOR'd with the end tap for feedback to the first stage. This is illustrated at step 302. In embodiments, the same logical operation is used with XNOR gate and a NOR gate. In other embodiments, the method 300 may use a complement arrangement of only one XNOR and only one AND or a complement arrangement of only one XOR and only one NAND. This is illustrated at step 303.

The method 300 continues by testing different combinations of candidate pairs of non-end taps to determine pair combinations that provide maximal or near-maximal length sequences of the n-stage register by searching for suitable pairs of non-end taps using three taps: the end tap, and candidate pairs of non-end taps, using every logic operation of three bits subject to the optimization restriction that 1 and 0 are equally likely. This is illustrated at step 304. If is were more likely than 0s as output for all the possible inputs, then the outputs in general would have more is than 0s, so the counter could not cover almost all the states.

For an n-stage register then there would be (n−1)*(n−2)/2 possibilities to consider. The number of possible pairs to search may be determined as: selecting the last tap for the XOR, selecting one of the n−1 other taps for the first OR input, selecting one of the n−2 remaining taps for the second input, and dividing the possibilities by 2, as the order of the OR inputs does not matter.

The register may be initialized to a value other than all 0000s (or all 1111s for a complement arrangement of taps) and may run the register at most $2^n$ times until it generates a register state which has been seen before. The length of the sequence is the number of states from first occasion that repeated state was seen to the second occasion.

If all the possible $2^{n-1}$ states have been reached except 1 (the all 0000s), and the last new state found is followed by the first state, then this is a maximal length sequence.

For a near maximal length sequence, it may be determined if the number of states seen so far is $2^{n-1}$ or more. If it is, then any other sequence generated from a different starting state cannot be as long. If it is not, a state not seen so far will be chosen and the sequence will be generated again. The length of this sequence will be measured, and the process will be repeated until all the states are seen or the number of unseen states is less than the length of the longest sequence found so far.

The method 300 continues by obtaining one or more suitable pairs of non-end taps. This is illustrated at step 305. For each suitable pair of non-end taps, the method 300 may identify another suitable pair of non-end taps as the mirror of the taps in the n-stage register, wherein tap sequence [n, A, B] mirrors to [n, n−B, n−A]. This is illustrated at step 306.

The method 300 continues by using a suitable pair of non-end taps in the feedback logic arrangement of the register. This is illustrated at step 307.

FIGS. 4 to 7 show generalized n-stage NLFSRs 400, 500, 600, 700 with feedback logical operations, in accordance with embodiments of the present disclosure. n is restricted to n-stage registers that require more than two taps for maximal length sequences in linear feedback arrangements in LFSRs and for which suitable non-end taps are found, for example, using the method 300 of FIG. 3.

Figure 4:
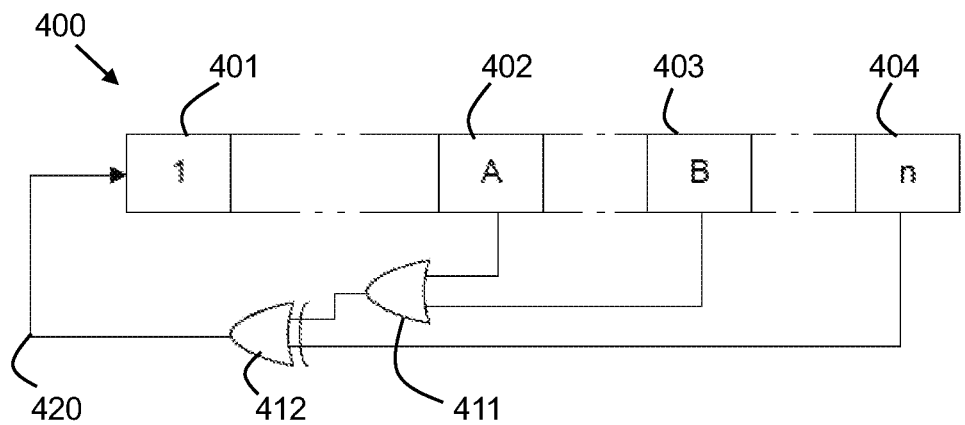
FIG. 4 is a schematic circuit diagram of a generalized stage NLFSR, in accordance with a first embodiment of the present disclosure.

Referring now to FIG. 4, shown is an example register 400 with a first embodiment of the described logical feedback of only one OR 411 and only one XOR gate 412, for n number of stages, numbered "1" 401 to "n" 404 from left to right in the register.

Inputs for the OR gate 411 are the outputs of two suitable stages "A" 402 and "B" 403, where A, B<n and A≠B and where A and B are suitable non-end taps. Inputs for the XOR gate 412 are the output of stage n 404 and the output of the OR gate 411. The input 420 for stage 1 401 is the output of the XOR gate 412.

Figure 5:
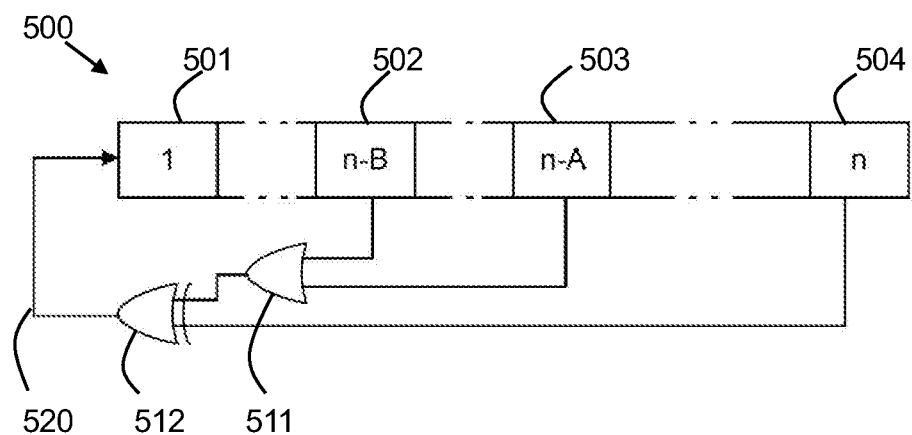
FIG. 5 is a schematic circuit diagram of a mirror generalized stage NLFSR, in accordance with a second embodiment of the present disclosure.

Referring now to FIG. 5, shown is an example register 500 with a second embodiment of the described logical feedback of only one OR 511 and only one XOR gate 512, for n number of stages, numbered "1" 501 to "n" 504 from left to right in the register. The second embodiment is a mirror or reverse of the logical arrangement of the first embodiment.

Inputs for the OR gate 511 are the outputs of two mirror suitable stages "n−B" 502 and "n−A" 503. Inputs for the XOR gate 512 are the output of stage n 504 and the output of the OR gate 511. The input 520 for stage 1 501 is the output of the XOR gate 512.

Figure 6:
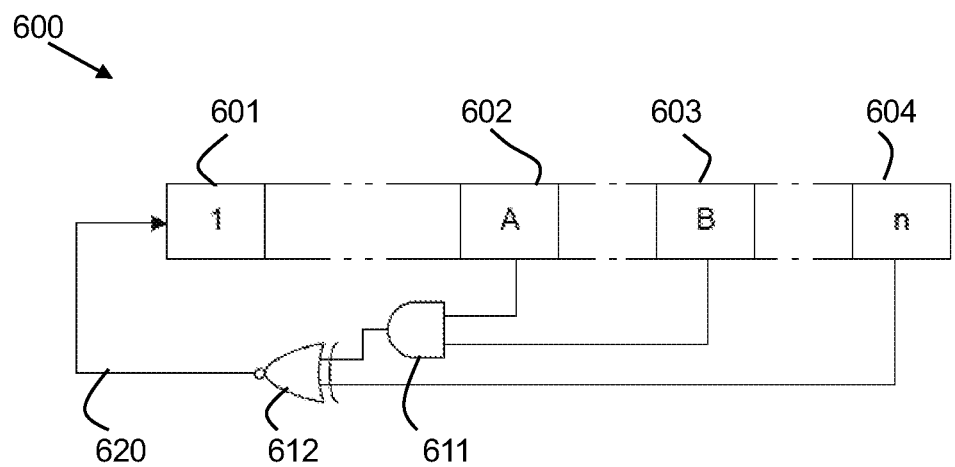
FIG. 6 is a schematic circuit diagram of a complement generalized stage NLFSR, in accordance with a third embodiment of the present disclosure.

Referring now to FIG. 6, shown is an example register 600 with a third embodiment of a complement of the first embodiment. Specifically, shown is the described logical feedback of only one AND 611 and only one XNOR gate 612, for n number of stages, numbered "1" 601 to "n" 604 from left to right in the register.

Inputs for the AND gate 611 are the outputs of two suitable stages "A" 602 and "B" 603, where A, B<n and A≠B and where A and B are suitable non-end taps. Inputs for the XNOR gate 612 are the output of stage n 604 and the output of the AND gate 611. The input 620 for stage 1 601 is the output of the XNOR gate 612.

Figure 7:
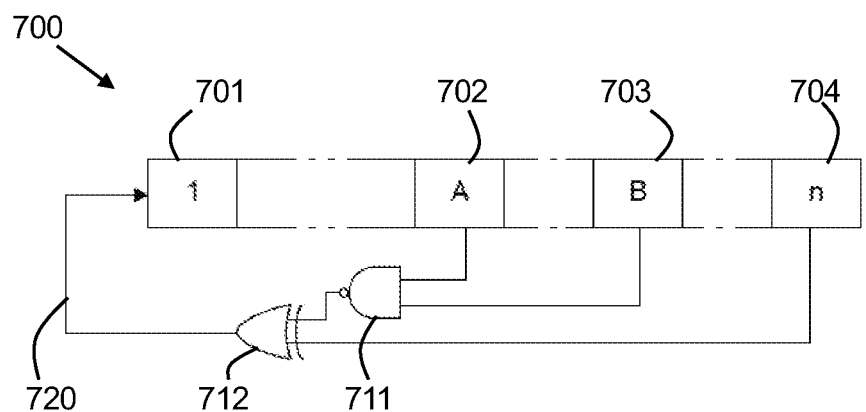
FIG. 7 is a schematic circuit diagram of another complement generalized stage NLFSR, in accordance with a fourth embodiment of the present disclosure.

Referring now to FIG. 7, shown is an example register 700 with a fourth embodiment of another complement of the first embodiment. Specifically, shown is the described logical feedback of only one NAND 711 and only one XOR gate 712, for n number of stages, numbered "1" 701 to "n" 704 from left to right in the register.

Inputs for the NAND gate 711 are the outputs of two suitable stages "A" 702 and "B" 703, where A, B<n and A≠B and where A and B are suitable non-end taps. Inputs for the XOR gate 712 are the output of stage n 704 and the output of the NAND gate 711. The input 720 for stage 1 701 is the output of the XOR gate 712.

Complement arrangements of the mirror embodiment of FIG. 5 may also be used. Put another way, mirror arrangements of the complement arrangements of FIGS. 6 and 7 may also be used.

In the example of an n-stage register with n up to 24, the set n={8, 12, 13, 14, 16, 19, 24} are the registers for which four taps are required in a LFSR. However, n may be extended higher than 24.

Examples of existing taps for maximal length LFSRs from 2 to 24 bits are as follows. It is noted that generators with 8, 12, 13, 14, 16, and 24 bits require 4 taps, and these registers are the focus of the described method and apparatus, although the disclosed methods and apparatuses can also apply to generators with other bits.

{2,1}
{3,2}
{4,3}
{5,3}
{6,5}
{7,6}
{8,6,5,4}
{9,5}
{10,7}
{11,9}
{12,11,8,6}
{13,12,10,9}
{14,13,11,9}
{15,14}
{16,14,13,11}
{17,14}
{18,11}
{19,18,17,14}
{20,17}

{21,19}
{22,21}
{23,18}
{24,23,21,20}

In this description, taps are referred to by number in a register with the input first stage as 1 and the end stage as n. Where two successive register inputs are described, then A1 to An and B1 to Bn are used.

Figure 8:
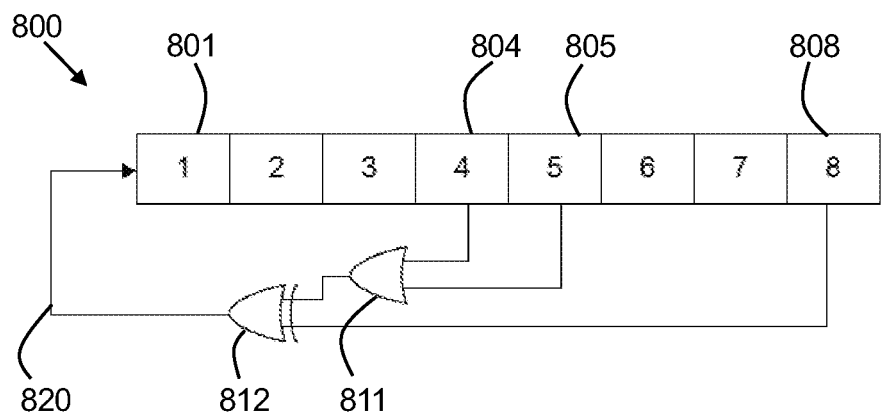
FIG. 8 is a schematic circuit diagram of an 8-stage NLFSR in accordance with the first embodiment of FIG. 4.

Referring now to FIG. 8, shown is an example 8-stage register 800 with the described logical feedback of the first embodiment of FIG. 4. Suitable taps that achieve maximal length for an 8-stage register 800 using the described logical feedback are as follows:

n=8 a=3 b=4, length=255;
n=8 a=1 b=5, length=255;
n=8 a=4 b=5, length=255;
n=8 a=3 b=7, length=255.

FIG. 8 shows the example suitable non-end taps of A=4 804 and B=5 805. Inputs for the OR gate 811 are the outputs of two suitable stages A=4 804 and B=5 805. Inputs for the XOR gate 812 are the output of stage n=8 808 and the output of the OR gate 811. The input 820 for stage 1 801 is the output of the XOR gate 812.

Where A1 to A8 are the current states of an 8-stage shift register and B1 to B8 are the corresponding next states:

B1=(A4 OR A5) XOR A8
B2=A1
B3=A2
B4=A3
B5=A4
B6=A5
B7=A6
B8=A7

The illustrated embodiment requires one OR gate and one XOR gate. The taps need to be chosen appropriately, but when they are operable they can generate a sequence of $2^n-1$. For an 8-stage register, it can generate the maximal 255 values before repeating.

Figure 9:
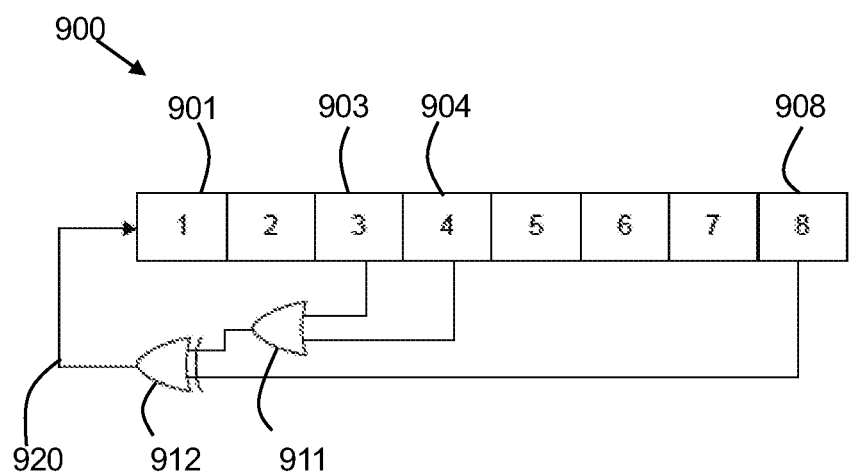
FIG. 9 is a schematic circuit diagram of an 8-stage NLFSR in accordance with the second embodiment of FIG. 5.

Having obtained one set of taps, others can be generated by mirroring or reversing: e.g., given T8 XOR (T5 OR T4) then there is T8 XOR (T3 OR T4), as detailed in FIG. 9.

Referring now to FIG. 9, shown is an example 8-stage register 900 with the described logical feedback of the second embodiment of FIG. 5 as a mirror of the embodiment of FIG. 8. The example mirrored suitable non-end taps are n−B=3 903 and n−A=4 904. Inputs for the OR gate 911 are the outputs of the mirrors 3 903 and 4 904. Inputs for the XOR gate 912 are the output of stage n=8 908 and the output of the OR gate 911. The input 920 for stage 1 901 is the output of the XOR gate 912.

Figure 10:
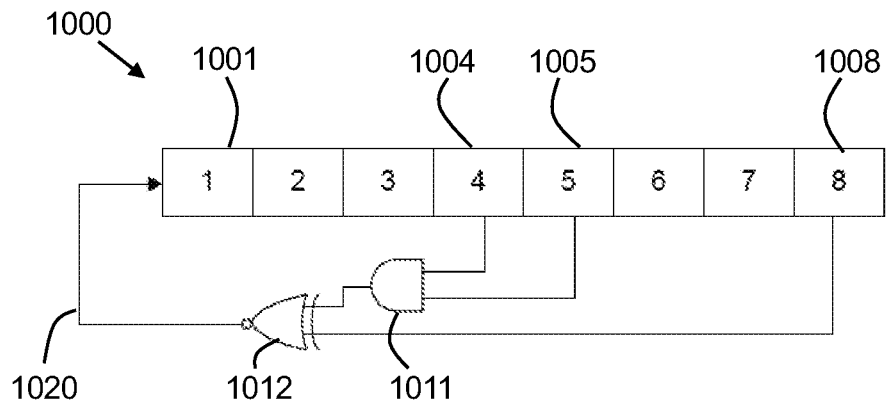
FIG. 10 is a schematic circuit diagram of an 8-stage NLFSR in accordance with the third embodiment of FIG. 6.

Referring now to FIG. 10, shown is an example 8-stage register 1000 with the described logical feedback of the third embodiment of FIG. 6 of a complement arrangement. FIG. 10 shows a complement of the register of FIG. 8.

FIG. 10 uses the example suitable non-end taps as used in FIG. 8 of A=4 1004 and B=5 1005. Inputs for the AND gate 1011 are the outputs of two the suitable stages A=4 1004 and B=5 1005. Inputs for the XNOR gate 1012 are the output of stage n=8 1008 and the output of the OR gate 1011. The input 1020 for stage 1 1001 is the output of the XNOR gate 1012.

This complement arrangement of T8 XNOR (T5 AND T4) may also be mirrored to provide T8 XNOR (T3 AND T4).

Figure 11:
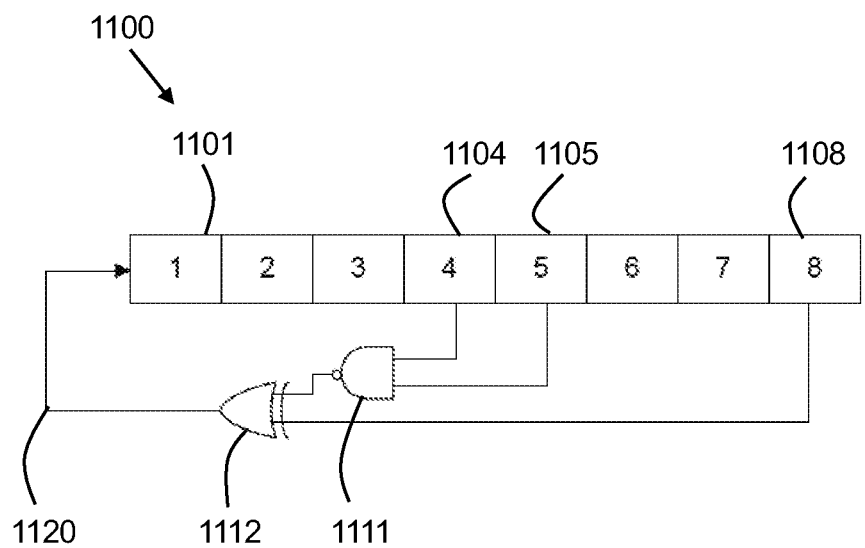
FIG. 11 is a schematic circuit diagram of an 8-stage NLFSR in accordance with the fourth embodiment of FIG. 7.

Referring now to FIG. 11, shown is an example 8-stage register 1100 with the described logical feedback of the fourth embodiment of FIG. 7 of an alternative complement arrangement. FIG. 11 shows another complement of the register of FIG. 8.

FIG. 11 uses the example suitable non-end taps as used in FIG. 8 of A=4 1104 and B=5 1105. Inputs for the NAND gate 1111 are the outputs of two the suitable stages A=4 1104 and B=5 1105. Inputs for the XOR gate 1112 are the output of stage n=8 1108 and the output of the OR gate 1111. The input 1120 for stage 1 1101 is the output of the XOR gate 1112.

This complement arrangement of T8 XOR (T5 NAND T4) may also be mirrored to provide T8 XOR (T3 NAND T4).

There is a second suitable pair of taps for an 8-bit register and the logical operations are:

T8 XOR (T7 OR T3)
with mirrors as follows:
T8 XOR (T5 OR T1)
and complements as follows
T8 XNOR (T7 AND T3)
T8 XNOR (T5 AND T1)
T8 XOR (T7 NAND T3)
T8 XOR (T5 NAND T1)

Maximal length was achieved for 12-stage register as follows:

n=12 a=4 b=7, length=4095;
n=12 a=5 b=8, length=4095.

For a 12-stage counter the described method has an example suitable non-end pair of taps of 5 and 8:

B1=(A5 OR A8) XOR A12
B2=A1
B3=A2
B4=A3
B5=A4
B6=A5
B7=A6
B8=A7
B9=A8
B10=A9
B11=A10
B12=A11

The 12-stage register logical operations for the suitable pair of 8 and 5 are:

T12 XOR (T8 OR T5) or logical equivalent T12 XNOR (T8 NOR T5)
with mirrors as follows:
T12 XOR (T7 OR T4) or logical equivalent T12 XNOR (T7 NOR T4)
and complements as follows
T12 XNOR (T8 AND T5)
T12 XNOR (T7 AND T4)
T12 XOR (T8 NAND T5)
T12 XOR (T7 NAND T4)

LFSRs can also be used in problems expressed using Boolean Satisfiability. For example, LFSR sequences are used to solve the Hamiltonian Cycle problem. Minimizing the number of clauses to express the LFSR simplifies solving of the problem.

The expression (A4 OR A5) XOR A8 can be encoded as just 6 clauses in Conjunctive Normal Form, for example, all these 6 clauses must be true:

A8| !A4|B1
A8| !A5|B1
!A8| A4| A5|B1
A8|A4|A5|!B1
!A8| A4| !B1
!A8| A5| !B1

The following table summarizes the suitable taps found for n=8 and n=12 that provide maximal length sequences.

| Stage | Taps | Length | Maximal |
|---|---|---|---|
| 8 | 8, 4, 3 | 255 | 255 |
| 8 | 8, 5, 1 | 255 | 255 |
| 8 | 8, 5, 4 | 255 | 255 |
| 8 | 8, 7, 3 | 255 | 255 |
| 12 | 12, 7, 4 | 4095 | 4095 |
| 12 | 12, 8, 5 | 4095 | 4095 |

Figure 12A:
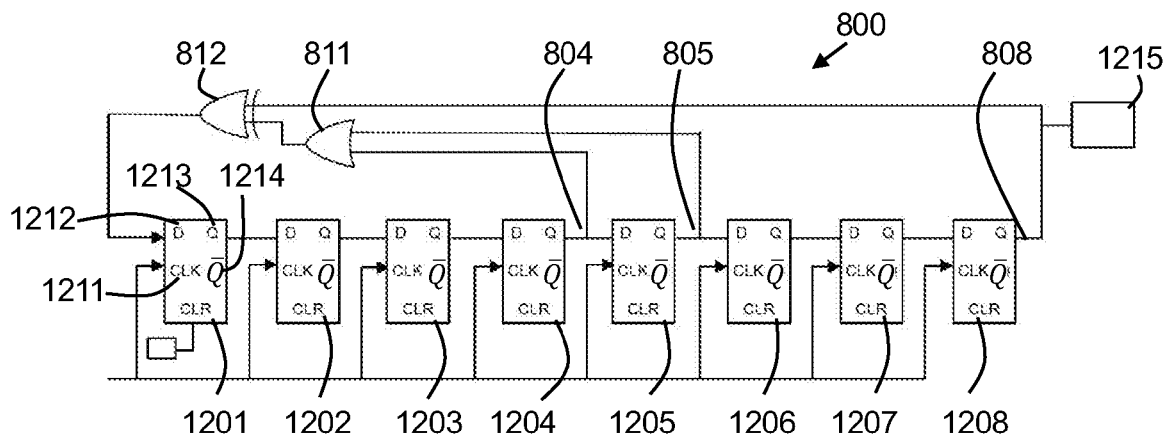
FIGS. 12A to 12C are schematic circuit diagrams showing more details of the registers of FIGS. 8, 10 and 11, in accordance with embodiments of the present disclosure.
Figure 12B:
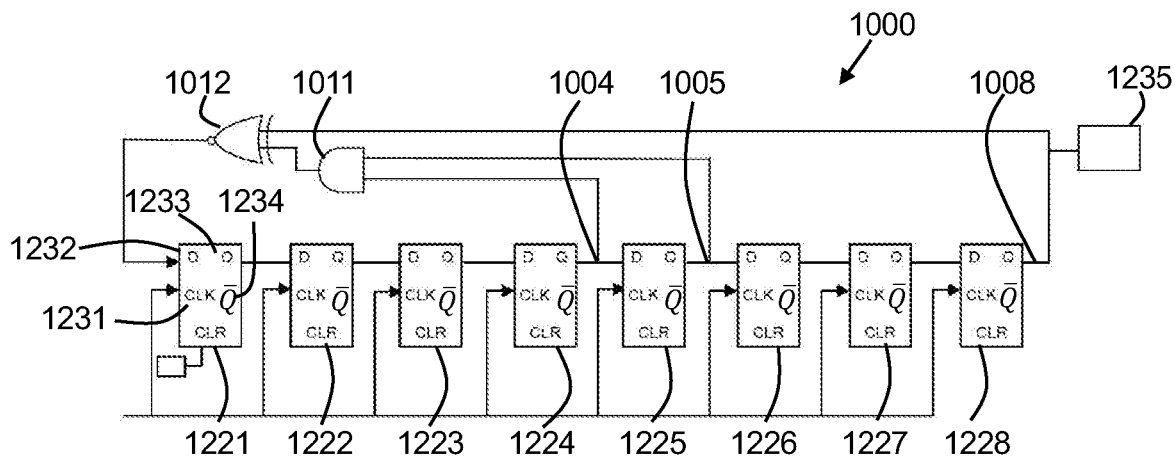
Figure 12C:
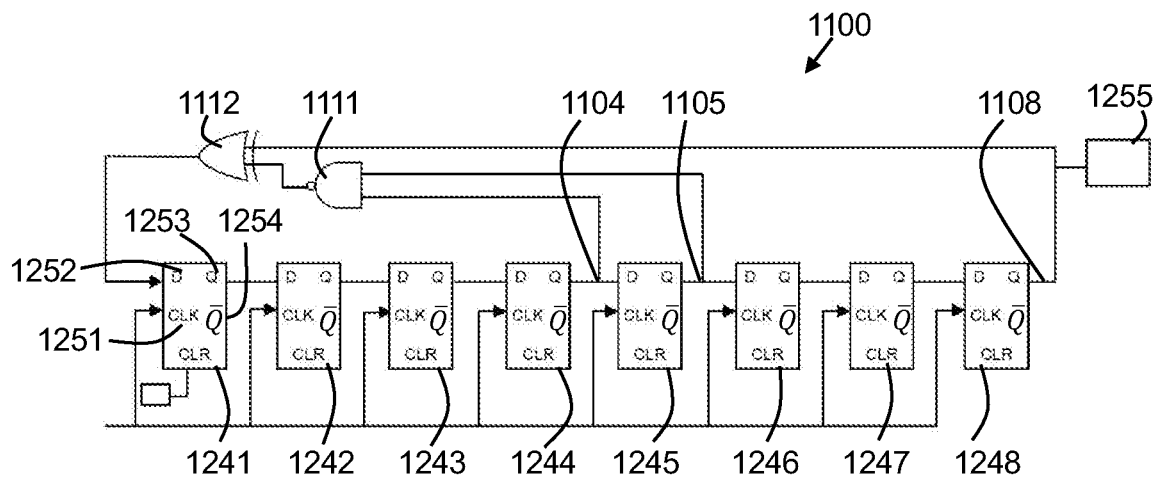

FIGS. 12A, 12B and 12C show the registers 800, 1000, and 1100 of FIGS. 8, 10 and 11, respectively, in more detail.

Referring now to FIG. 12A, shown is the register of FIG. 8 800 with the eight stages provided by D-type flip flops 1201-1208. Each flip flop 1201-1208 has a clock input (CLK) 1211, data input (D) 1212, and outputs (Q) 1213, inverted output (Q) 1214.

FIG. 12A shows the register 800 with non-end taps 804 and 805, end tap 808, and the feedback logical operation provided by an OR gate 811 and an XOR gate 812. The register output 1215 is also shown.

Referring now to FIG. 12B, shown is the register of FIG. 10 1000 of a first complement arrangement with the eight stages provided by D-type flip flops 1221-1228. Each flip flop 1221-1228 has a clock input (CLK) 1231, data input (D) 1232, and outputs (Q) 1233, inverted output (Q) 1234.

FIG. 12B shows the register 1000 with non-end taps 1004 and 1005, end tap 1008, and the feedback logical operation provided by an XNOR gate 1012 and an AND gate 1011. The register output 1235 is also shown.

Referring now to FIG. 12C, shown is the register of FIG. 11 1100 of a second complement arrangement with the eight stages provided by D-type flip flops 1241-1248. Each flip flop 1241-1248 has a clock input (CLK) 1251, data input (D) 1252, and outputs (Q) 1253, inverted output (Q) 1254.

FIG. 12C shows the register 1100 with non-end taps 1104 and 1105, end tap 1108, and the feedback logical operation provided by an XOR gate 1112 and a NAND gate 1111. The register output 1255 is also shown.

The described non-linear feedback arrangement of two gates may be used by other n-stage registers that require more than two taps for maximal length sequences in LFSRs but may only give near-maximal length sequences. These may also be useful as the non-linear feedback arrangement of only two gates is a simplified feedback arrangement.

The following tap and near-maximal length sequences have been found.

Length 8135 (compared to 8191):
for n=13: A=7, B=3; A=8, B=4 and mirrors A=10, B=6; A=9, B=5
Length 16244 (compared to 16383)
for n=14: A=6, B=1 and mirror A=13, B=8
Length 63724 (compared to 65535)
for n=16: A=12, B=1 and mirror A=15, B=4
Length 508357 (compared to 524287)
for n=19: A=12, B=3 and mirror A=16, B=7
Length 16570233 (compared to Ser. No. 16/777,215)
for n=24: A=20, B=3 and mirror A=21, B=4
Length 66542149 (compared to 67/108,863)
for n=26: A=9, B=2 and mirror A=24, B=17
Length 133072290 (compared to 134217727)
for n=27: A=16, B=4 and mirror A=23, B=11

In some cases, a hybrid LFSR can generate a sequence of $2^n-1$ with two XORs. However, this has the disadvantage of requiring access to both the middle of the shift register and the end to insert data. The described NLFSR only requires access to the end to insert data (although data is read from taps in the middle of the register).

From tests, the following provide examples of the longest non-maximal length sequences with 2 taps, with the maximal possible with 3 (hybrid) or 4 taps in parentheses.
{8,5}: 217 (255)
{12,11}: 3255 (4095)
{13,10}: 8001 (8191)
{14,13}: 11811 (16383)
{16,9}: 63457 (65535)
{19,12} 520065 (524287)
{19,13} 520065 (524287)
{24,19} 16766977 (16777215)
and mirrors (reversals):
{8,3}: 217 (255)
{12,1}: 3255 (4095)
{13,3}: 8001 (8191)
{14,1}: 11811 (16383)
{16,7}: 63457 (65535)
{19,6} 520065 (524287)
{19,7} 520065 (524287)
{24,5} 16766977 (16777215)

Previously the minimum was two XOR gates and the longest non-maximal length sequences with few taps as given above. The described method provides a maximal length sequence or a near maximal length sequence with only one OR gate and one XOR gate.

The described method gives a useful increase in cycle length for a small gate count.

The prior art NLFSR of Dubrova includes the following where numbers between commas are taps which are XORed, and inside parentheses are ANDed.
0,1,6,(4,5)
x0 XOR x1 XOR x5 XOR (x4 AND x5)
0,3,4,(3,4)
x0 XOR x3 XOR x4 XOR (x3 AND x4).
0,3,8,(3,9)
x0 XOR x3 XOR x8 XOR (x3 AND x9)
0,4,7,(4,7)
x0 XOR x4 XOR x7 XOR (x4 AND x7)

Dubrova uses the shift register in the other direction and takes the first tap as tap 0, so this can be converted by replacing each number x by n-x.

This gives Dubrova as:
A8 XOR A5 XOR A4 XOR (A5 AND A4)
compared to the described method:
A8 XOR (A5 OR A4)

The described method uses the simpler logical function of one OR and one XOR instead of 3 XORs and 1 AND.

A XOR B XOR C XOR (B AND C)
can be simplified as follows:
ABC
000=0
001=1
010=1
011=1
100=1
101=0
110=0
111=0

This is the same as: A XOR (B or C)

Although they are logically equivalent it was not obvious to Dubrova, a person skilled in the art, that this simplification was possible. Dubrova's taps cannot in general be simplified to those of the described method, except those of the form: n,a,b,(a,b)

Those few can be simplified to the described method, but this is not obvious. With n=8 she lists 42 sets of taps of which only 2 could be simplified to the described method, and she does not note those as being special. With n=12 she lists 36 sets of taps of which only 1 could be simplified to the described method, and she does not note that set as being special.

The simplification is the key to the described method and the appropriate taps must be chosen for this to be possible.

Figure 13:
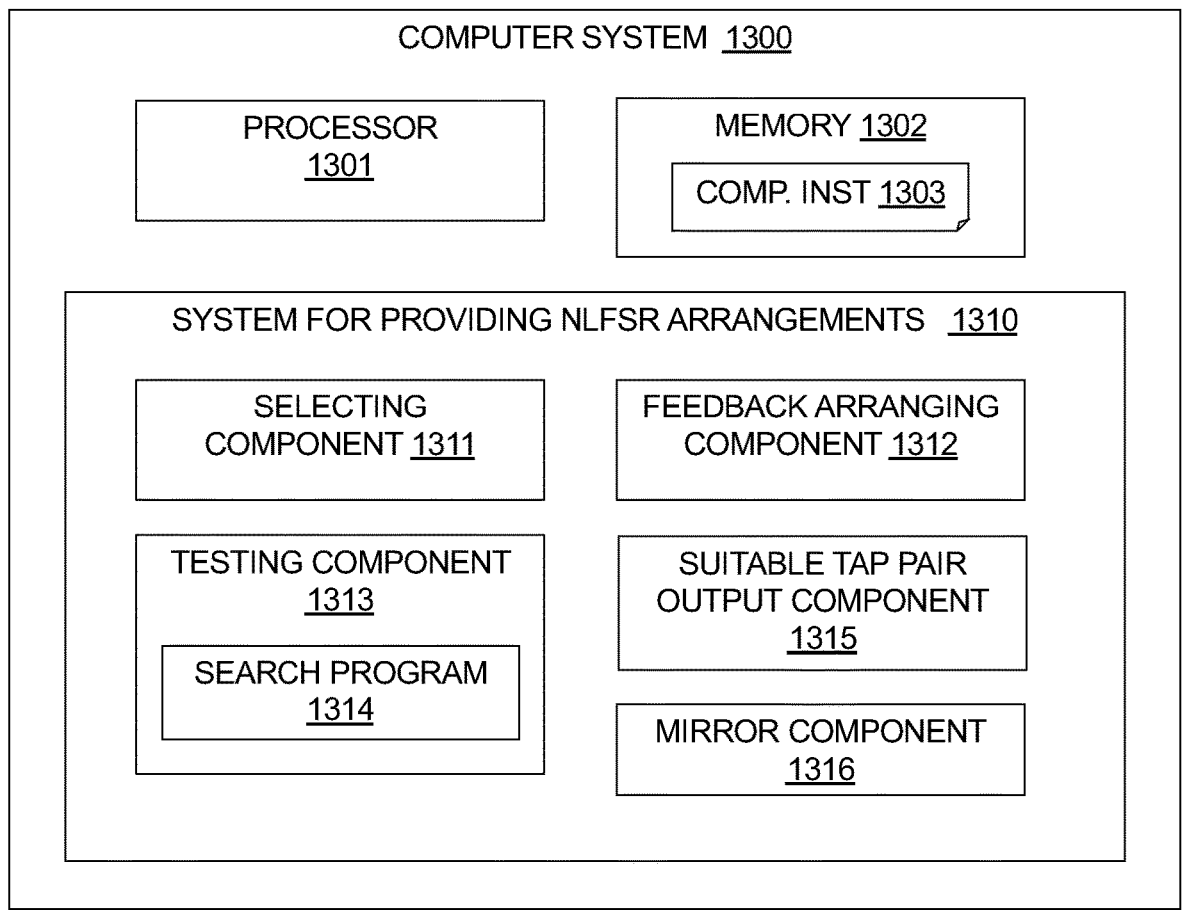
FIG. 13 is block diagram of an example embodiment of a system in accordance with the embodiments of the present disclosure.

Referring to FIG. 13, a block diagram shows a computer system 1300 including a system for providing a non-linear NLFSR arrangements with maximal length sequences 1310.

The computer system 1300 may include at least one processor 1301, a hardware module, or a circuit for executing the functions of the described components which may be software units executing on the at least one processor. Multiple processors running parallel processing threads may be provided enabling parallel processing of some or all of the functions of the components. Memory 1302 may be configured to provide computer instructions 1303 to the at least one processor 1301 to carry out the functionality of the components.

The system for providing a non-linear NLFSR arrangements 1310 may include a selecting component 1311 for selecting n, where n requires more than two taps in maximal length linear feedback shift registers.

The system 1310 includes a feedback arranging component 1312 for arranging a feedback logical operation of only one OR gate and only one XOR gate, taking logical OR of two suitable non-end taps and XOR with the end tap for feedback to the first stage or a complement logical operation. A first complement logical operation is of only one NAND gate and only one XOR gate in which the logical operation takes logical NAND of two suitable non-end taps and logical XOR with the end tap for feedback to the first stage. A second complement logical operation is of only one AND gate and only one XNOR gate in which the logical operation takes logical AND of two suitable non-end taps and logical XNOR with the end tap for feedback to the first stage.

The system 1310 may include a testing component 1313 for obtaining one or more suitable pairs of non-end taps by testing different combinations of two non-end taps to determine pair combinations that provide maximal length sequences of the n-stage register. The testing component 1313 may include a search program 1314 operating on three taps: the end tap, and two non-end taps, using every combination of the logic operation subject to the optimization restriction that 1 and 0 are equally likely. The system 1310 may include a suitable tap pair output component 1315 for outputting suitable non-end tap pairs for use in the feedback arranging component 1312.

The system 1310 may include a mirror component 1316 for taking one suitable pair of non-end taps and obtaining another suitable pair of non-end taps as the mirror of the taps in the n-stage register, wherein tap sequence [n, A, B] mirrors to [n, n–B, n–A].

Figure 14:
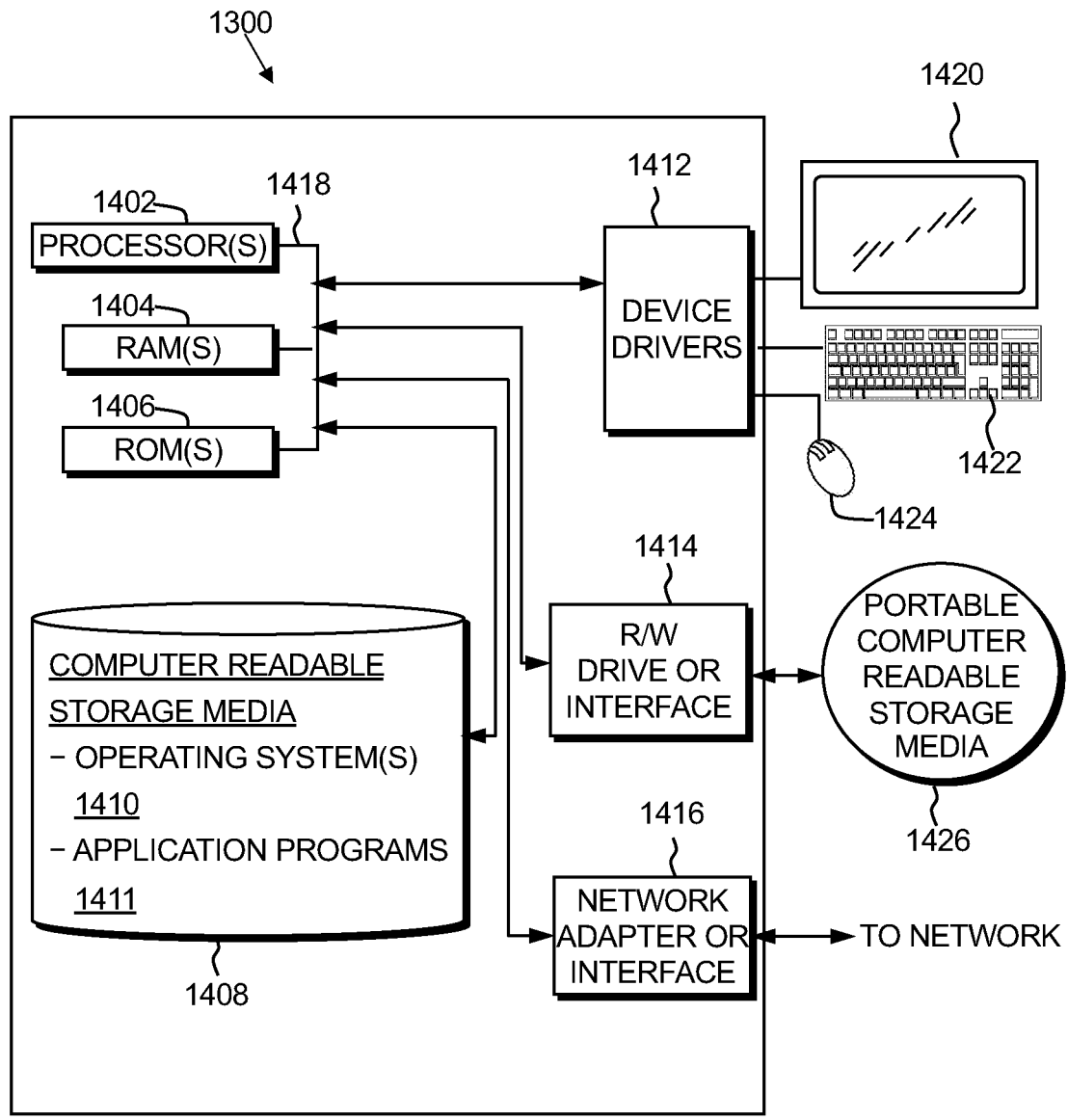
FIG. 14 is a block diagram of an embodiment of a computer system in which embodiments of the present disclosure may be implemented.

FIG. 14 depicts a block diagram of components of the computer system 1300 of FIG. 13, in accordance with an embodiment of the present invention. It should be appreciated that FIG. 14 provides only an illustration of one implementation and does not imply any limitations with regard to the environments in which different embodiments may be implemented. Many modifications to the depicted environment may be made.

Computer system 1300 can include one or more processors 1402, one or more computer-readable RAMs 1404, one or more computer-readable ROMs 1406, one or more computer readable storage media 1408, device drivers 1412, read/write drive or interface 1414, and network adapter or interface 1416, all interconnected over a communications fabric 1418. Communications fabric 1418 can be implemented with any architecture designed for passing data and/or control information between processors (such as microprocessors, communications and network processors, etc.), system memory, peripheral devices, and any other hardware components within the system.

One or more operating systems 1410, and application programs 1411, such as the system for providing NLFSR arrangements 1310 are stored on one or more of the computer readable storage media 1408 for execution by one or more of the processors 1402 via one or more of the respective RAMs 1404 (which typically include cache memory). In the illustrated embodiment, each of the computer readable storage media 1408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computer system 1300 can also include a R/W drive or interface 1414 to read from and write to one or more portable computer readable storage media 1426. Application programs 1411 on computer system 1300 can be stored on one or more of the portable computer readable storage media 1426, read via the respective R/W drive or interface 1414 and loaded into the respective computer readable storage media 1408.

Computer system 1300 can also include a network adapter or interface 1416, such as a TCP/IP adapter card or wireless communication adapter. Application programs 1411 on computer system 1300 can be downloaded to the computing device from an external computer or external storage device via a network (for example, the Internet, a local area network or other wide area networks or wireless networks) and network adapter or interface 1416. From the network adapter or interface 1416, the programs may be loaded into the computer readable storage media 1408. The network may comprise copper wires, optical fibers, wireless transmission, routers, firewalls, switches, gateway computers and edge servers.

Computer system 1300 can also include a display screen 1420, a keyboard or keypad 1422, and a computer mouse or touchpad 1424. Device drivers 1412 interface to display screen 1420 for imaging, to keyboard or keypad 1422, to computer mouse or touchpad 1424, and/or to display screen 1420 for pressure sensing of alphanumeric character entry and user selections. The device drivers 1412, R/W drive or interface 1414, and network adapter or interface 1416 can comprise hardware and software stored in computer readable storage media 1408 and/or ROM 1406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to a first aspect of the present invention there is provided a method for using a non-linear feedback shift register (NLFSR) with maximal or near-maximal length sequences for generating a pseudo-random sequence for n number of stages, wherein a maximal length is $2^n-1$, comprising: selecting n, where n requires more than two taps in maximal length linear feedback shift registers; and for the selected n stage register, using a feedback logical operation of only one OR gate and only one XOR gate in which the logical operation takes logical OR of two suitable non-end taps and logical XOR with the end tap for feedback to the first stage, or an equivalent XNOR gate and NOR gate logical operation, or a complement logical operation.

The method provides the advantage of a simple two-gate logical operation in a NLFSR that provides maximal or near-maximal length sequences for n-stage registers that usually require more than two taps. The method minimizes the number of gates with no middle feedback to the register required whilst providing long pseudo-random sequences.

A complement logical operation may be of only one not-AND (NAND) gate and only one XOR gate in which the logical operation takes logical NAND of two suitable non-end taps and logical XOR with the end tap for feedback to the first stage. Another complement logical operation may be of only one AND gate and only one XNOR gate in which the logical operation takes logical AND of two suitable non-end taps and logical XNOR with the end tap for feedback to the first stage.

For some n, a maximal length sequence is obtained with two suitable non-end taps or a complement arrangement and for some other n, a best near-maximal length sequence is obtained with two suitable non-end taps or a complement arrangement.

According to another aspect of the present invention there is provided a non-linear feedback shift register (NLFSR) with maximal or near-maximal length sequences for generating a pseudo-random sequence for n number of stages, wherein a maximal length is $2^n-1$, comprising: an n-stage register, where n requires more than two taps in maximal length linear feedback shift registers; a feedback logical operation of only one OR gate and only one XOR gate, taking logical OR of two suitable non-end taps and XOR with the end tap for feedback to the first stage, or an equivalent XNOR gate and NOR gate logical operation, or a complement logical operation, wherein the suitable non-end taps provide maximal or near-maximal length sequences of the n-stage register.

A complement logical operation may be of only one NAND gate and only one XOR gate in which the logical operation takes logical NAND of two suitable non-end taps and logical XOR with the end tap for feedback to the first stage. Another complement logical operation may be of only one AND gate and only one XNOR gate in which the logical operation takes logical AND of two suitable non-end taps and logical XNOR with the end tap for feedback to the first stage. Another complement For some n, a maximal length sequence is obtained with two suitable non-end taps or a complement arrangement, and for some other n, a best near-maximal length sequence is obtained with two suitable non-end taps or a complement arrangement.

According to another aspect of the present invention there is provided a non-linear feedback shift register (NLFSR) with maximal length sequences for generating a pseudo-random sequence for n number of stages, wherein a maximal length is $2^n-1$, comprising: an n-stage register, where n is 8 or 12 that each require more than two taps in maximal length linear feedback shift registers; and a logical feedback operation of only one OR gate and only one XOR gate, taking logical OR of two suitable non-end taps A, B, and logical XOR with the end tap for feedback to the first stage, or an equivalent XNOR gate and NOR gate logical operation, or a complement logical operation, wherein the suitable non-end taps provide maximal length sequences of the n-stage register; wherein the two suitable non-end taps are taken from the group of: for n=8: A=4, B=3; A=5, B=1; and mirrors A=5, B=4; A=7, B=3; for n=12: A=7, B=4; and mirror A=8, B=5.

The NLFSR for 8-stage and 12-stage registers provides the maximal length sequences with the defined non-end taps.

A complement logical operation is of only one NAND gate and only one XOR gate in which the logical operation takes logical NAND of two suitable non-end taps A, B, and logical XOR with the end tap for feedback to the first stage.

Another complement logical operation is of only one AND gate and only one XNOR gate in which the logical operation takes logical AND of two suitable non-end taps A, B, and logical XNOR with the end tap for feedback to the first stage.

According to another aspect of the present invention there is provided a method for providing a non-linear feedback shift register (NLFSR) with maximal or near maximal length sequences for generating a pseudo-random sequence for n number of stages, wherein a maximal length is $2^n-1$, comprising: selecting n, where n requires more than two taps in maximal length linear feedback shift registers; for a selected n-stage register, using a feedback logical operation of only one OR gate and only one XOR gate, taking logical OR of two suitable non-end taps and XOR with the end tap for feedback to the first stage, or an equivalent XNOR gate and NOR gate logical operation, or a complement logical operation; and obtaining one or more suitable pairs of non-end taps by testing different combinations of two non-end taps to determine pair combinations that provide maximal or near-maximal length sequences of the n-stage register.

The method may include obtaining one suitable pair of non-end taps and obtaining another suitable pair of non-end taps as the mirror of the taps in the n-stage register, wherein tap sequence [n, A, B] mirrors to [n, n–B, n–A].

Obtaining one or more suitable pairs of non-end taps may include using a search program operating on three taps: the end tap, and two non-end taps, using every combination of the logic operation, except all zeros, subject to the optimization restriction that 1 and 0 are equally likely.

The search program may initialize the register to a value other than all zeros, or all ones for a complement logical operation, and running the register at most $2^{n-1}$ times until a register state is generated that is a repeat with the length of the sequence being the number of states from the first occasion a state was seen to a second occasion the state was seen.

For a near maximal length sequence, the search program may: determine if the number of states seen so far is $2^{n-1}$ or more; if it is, then the longest sequence found is the longest possible for that set of taps; if it is not, then a state not seen is chosen and the sequence generated again and the length measured; and these steps may be repeated until all the states are seen or the number of unseen states is less than the length of the longest sequence found.

A complement logical operation is of only one NAND gate and only one XOR gate in which the logical operation takes logical NAND of two suitable non-end taps and logical XOR with the end tap for feedback to the first stage. Another complement logical operation is of only one AND gate and only one XNOR gate in which the logical operation takes logical AND of two suitable non-end taps and logical XNOR with the end tap for feedback to the first stage.

According to a further aspect of the present invention there is provided a system for providing a non-linear feedback shift register (NLFSR) with maximal or near-maximal length sequences for generating a pseudo-random sequence for n number of stages, wherein a maximal length is $2^n-1$, comprising: a selecting component for selecting n, where n requires more than two taps in maximal length linear feedback shift registers; a feedback arranging component for arranging a feedback logical operation of only one OR gate and only one XOR gate, taking logical OR of two suitable non-end taps and XOR with the end tap for feedback to the first stage, or an equivalent XNOR gate and NOR gate logical operation, or a complement logical operation; and a testing component for obtaining one or more suitable pairs of non-end taps by testing different combinations of two non-end taps to determine pair combinations that provide maximal or near-maximal length sequences of the n-stage register.

The system may include a mirror component for taking one suitable pair of non-end taps and obtaining another suitable pair of non-end taps as the mirror of the taps in the n-stage register, wherein tap sequence [n, A, B] mirrors to [n, n–B, n–A].

The testing component for obtaining one or more suitable pairs of non-end taps may include a search program operating on three taps: the end tap, and two non-end taps, using every combination of the logic operation, except all zeros, subject to the optimization restriction that 1 and 0 are equally likely.

The search program may be configured to initialize the variables representing the register to a value other than all zeros, or all ones for a complement logical operation, and running the register at most $2^{n-1}$ times until a register state is generated that is a repeat with the length of the sequence being the number of states from the first occasion a state was seen to a second occasion the state was seen.

The search program may be configured to, for a near maximal length sequence: determine if the number of states seen so far is $2^{n-1}$ or more; if it is, then the longest sequence found is the longest possible for that set of taps; if it is not, then a state not seen is chosen and the sequence generated again and the length measured; and repeat these steps until all the states are seen or the number of unseen states is less than the length of the longest sequence found.

A complement logical operation is of only one NAND gate and only one XOR gate in which the logical operation takes logical NAND of two suitable non-end taps and logical XOR with the end tap for feedback to the first stage. Another complement logical operation is of only one AND gate and only one XNOR gate in which the logical operation takes logical AND of two suitable non-end taps and logical XNOR with the end tap for feedback to the first stage.

According to a further aspect of the present invention there is provided a method for providing a non-linear feedback shift register (NLFSR) with maximal or near maximal length sequences for generating a pseudo-random sequence for n number of stages, wherein a maximal length is $2^n-1$, the computer program product comprising a computer readable storage medium having program instructions embodied therewith, the program instructions executable by a processor to cause the processor to: select n, where n requires more than two taps in maximal length linear feedback shift registers; for a selected n-stage register, use a feedback logical operation of only one OR gate and only one XOR gate, taking logical OR of two suitable non-end taps and XOR with the end tap for feedback to the first stage, or an equivalent XNOR gate and NOR gate logical operation, or a complement logical operation; and obtain one or more suitable pairs of non-end taps by testing different combinations of two non-end taps to determine pair combinations that provide maximal or near-maximal length sequences of the n-stage register.

What is claimed is:

1. A method for using a non-linear feedback shift register (NLFSR) for generating a pseudo-random sequence with at least near-maximal length for n number of stages, wherein a maximal length is $2^n-1$, comprising:
   selecting n as the number of stages in the NLFSR, where n requires more than two taps in maximal length linear feedback shift registers; and
   generating, for the selected n-stage NLFSR, the pseudo-random sequence using a feedback logical operation of only a first logic gate and a second logic gate,
   wherein two non-end taps suitable for providing the at least near-maximal length pseudo-random sequence are inputs for the first logic gate,
   wherein an output of the first logic gate and an end tap are inputs for the second logic gate, and
   wherein an output of the second logic gate is used as feedback to a first stage of the n-stage NLFSR.

2. The method as claimed in claim 1, wherein the first logic gate is selected from a group consisting of an OR and a NAND gate, wherein the second logic gate is a XOR gate.

3. The method as claimed in claim 1, wherein the first logic gate is an AND gate and the second logic gate is an XNOR gate.

4. The method as claimed in claim 1, wherein
   a maximal length sequence is obtained with two non-end taps.

5. The method as claimed in claim 1, the method further comprising:
   obtaining one or more pairs of non-end taps by identifying, based on the number of stages n, pair combinations that provide at least near-maximal length sequences of the n-stage NLFSR.

6. The method as claimed in claim 5, wherein obtaining the one or more pairs of non-end taps includes:
   determining a first pair of non-end taps that includes a first non-end tap A and a second non-end tap B; and
   obtaining a second pair of non-end taps as the mirror of the first pair of non-end taps in the n-stage NLFSR, wherein tap sequence [n, A, B] mirrors to [n, n–B, n–A].

7. The method as claimed in claim 5, wherein obtaining the one or more pairs of non-end taps includes using a search program operating on three taps: the end tap, and two non-end taps, using every combination of logic operation, except all zeros, subject to an optimization restriction that 1 and 0 are equally likely.

8. The method as claimed in claim 7, wherein the search program initializes the n-stage NLFSR to a value other than all zeros, and runs the n-stage NLFSR at most $2^n$ times until a register state is generated that is a repeat, wherein a length of the sequence is a number of states from a first occasion a state was seen to a second occasion the state was seen.

9. The method as claimed in claim 8, wherein, for a near maximal length sequence for a set of taps, the search program:
   determines if a number of states seen so far is $2^{n-1}$ or more;
   if the number of states seen is $2^{n-1}$ or more, then the longest sequence found is the longest possible for that set of taps;
   if the number of states seen is less than $2^{n-1}$, then a new state is chosen, the sequence is generated again, and the length is measured; and
   repeats these steps until all the states are seen or the number of unseen states is less than the length of the longest sequence found.

10. A non-linear feedback shift register (NLFSR) for generating a pseudo-random sequence with at least near-maximal length for n number of stages, wherein a maximal length is $2^n-1$, comprising:
   an n-stage register, where n requires more than two taps in maximal length linear feedback shift registers;
   a first logic gate having two inputs, each input being connected to a non-end tap of the n-stage register; and a second logic gate having two inputs, a first input being connected to an output of the first logic gate and a second input being connected to an end tap of the n-stage register, wherein an output of the second logic gate is used as non-linear feedback to a first stage of the n-stage register to generate the pseudo-random sequence.

11. The NLFSR as claimed in claim 10, wherein the first logic gate is selected from a group consisting of an OR gate and a NAND gate, and the second logic gate is an XOR gate.

12. The NLFSR as claimed in claim 10, wherein the first logic gate is an AND gate and the second logic gate is an XNOR gate.

13. The NLFSR as claimed in claim 10, wherein
a near-maximal length sequence is obtained with two non-end taps.

14. A non-linear feedback shift register (NLFSR) for generating a pseudo-random sequence with maximal length for 8 stages, wherein the maximal length is 255, comprising:
an 8-stage register;
a first logic gate having a first input connected to a first non-end tap A of the 8-stage register and a second input connected to a second non-end tap B of the 8-stage register; and
a second logic gate having inputs connected to an output of the first logic gate and to an end tap of the 8-stage register,
wherein an output of the second logic gate is used as non-linear feedback to a first stage of the 8-stage register to generate the pseudo-random sequence,
wherein the first and second non-end taps are at positions selected from the group consisting of:
A=4, B=3; A=5, B=1; A=5, B=4; and A=7, B=3.

15. The NLFSR as claimed in claim 14, wherein the first logic gate is a NAND gate and the second logic gate is an XOR gate.

16. The NLFSR as claimed in claim 14, wherein the first logic gate is a AND gate and the second logic gate is an XNOR gate.

17. A non-linear feedback shift register (NLFSR) for generating a pseudo-random sequence with maximal length for 12 stages, wherein the maximal length is 4095, comprising:
a 12-stage register;
a first logic gate having a first input connected to a first non-end tap A of the 12-stage register and a second input connected to a second non-end tap B of the 12-stage register; and
a second logic gate having inputs connected to an output of the first logic gate and to an end tap of the 12-stage register,
wherein an output of the second logic gate is used as non-linear feedback to a first stage of the 12-stage register to generate the pseudo-random sequence,
wherein the first and second non-end taps are at positions selected from the group consisting of:
A=7, B=4; and A=8, B=5.

18. The NLFSR as claimed in claim 17, wherein the first logic gate is a NAND gate and the second logic gate is an XOR gate.

19. The NLFSR as claimed in claim 17, wherein the first logic gate is a AND gate and the second logic gate is an XNOR gate.

20. A system for providing a non-linear feedback shift register (NLFSR) with maximal or near-maximal length sequences for generating a pseudo-random sequence for n number of stages, wherein a maximal length is $2^n-1$, comprising:
a processor; and
a computer-readable storage medium communicatively coupled to the processor and storing program instructions which, when executed by the processor, cause the processor to perform a method comprising:
selecting n as the number of stages in the NLFSR, where n requires more than two taps in maximal length linear feedback shift registers; and
generating, for the selected n-stage NLFSR, the pseudo-random sequence using a feedback logical operation of only a first logic gate and a second logic gate,
wherein two non-end taps suitable for providing the at least near-maximal length pseudo-random sequence are inputs for the first logic gate,
wherein an output of the first logic gate and an end tap are inputs for the second logic gate, and
wherein an output of the second logic gate is used as feedback to a first stage of the n-stage NLFSR.

21. The system of claim 20, wherein the first logic gate is selected from a group consisting of an OR and a NAND gate, wherein the second logic gate is a XOR gate.

22. The system of claim 20, wherein the first logic gate is an AND gate and the second logic gate is an XNOR gate.

23. The system of claim 20, wherein
a maximal length sequence is obtained with two non-end taps.

24. The system of claim 20, wherein the method performed by the processor further comprises:
obtaining one or more pairs of non-end taps by identifying, based on the number of stages n, pair combinations that provide at least near-maximal length sequences of the n-stage register.

25. The system of claim 24, wherein obtaining the one or more pairs of non-end taps includes:
determining a first pair of non-end taps that includes a first non-end tap A and a second non-end tap B; and
obtaining a second pair of non-end taps as the mirror of the first pair of non-end taps in the n-stage register, wherein tap sequence [n, A, B] mirrors to [n, n-B, n-A].

* * * * *